United States Patent
Kwon

(10) Patent No.: US 8,030,834 B2
(45) Date of Patent: *Oct. 4, 2011

(54) FLAT DISPLAY DEVICE, PLASMA DEVICE PANEL AND FIELD EMISSION CONTAINING PHOSPHOR COATED WITH A HEAT-RESISTANT MATERIAL

(75) Inventor: Seung-Uk Kwon, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 149 days.

This patent is subject to a terminal disclaimer.

(21) Appl. No.: 12/194,446

(22) Filed: Aug. 19, 2008

(65) Prior Publication Data

US 2008/0315749 A1    Dec. 25, 2008

Related U.S. Application Data

(63) Continuation of application No. 11/244,735, filed on Oct. 6, 2005, now Pat. No. 7,429,340.

(30) Foreign Application Priority Data

Oct. 11, 2004    (KR) .................. 10-2004-0081093

(51) Int. Cl.
*H01J 61/32* (2006.01)
*H01J 1/62* (2006.01)
*H01J 29/10* (2006.01)
*H01J 17/49* (2006.01)
*C09K 11/54* (2006.01)
*C09K 11/70* (2006.01)
*C09K 11/08* (2006.01)
*B32B 5/16* (2006.01)

(52) U.S. Cl. ......... 313/483; 313/468; 313/495; 313/582

(58) Field of Classification Search .............. 313/467, 313/468, 485, 486, 495–497, 582, 584–587; 252/301.6 P, 301.6 F, 301.4 P, 301.4 F; 428/403, 428/404

See application file for complete search history.

(56) References Cited

U.S. PATENT DOCUMENTS 5,604,396 A * 2/1997 Watanabe et al. ............. 313/485
5,628,790 A * 5/1997 Davidson et al. ............. 623/2.36

(Continued)

FOREIGN PATENT DOCUMENTS

CN          86101965 A      9/1987

(Continued)

OTHER PUBLICATIONS

Zircadyne Corrosion Properties.*

(Continued)

*Primary Examiner* — Nimeshkumar Patel
*Assistant Examiner* — Steven Horikoshi
(74) *Attorney, Agent, or Firm* — Knobbe Martens Olson & Bear LLP

(57) ABSTRACT

Provided are a phosphor paste composition, a flat display device including the same, and a method of manufacturing the flat display device. The phosphor paste composition contains a phosphor with at least a heat-resistant material selected from a Group II atom-containing material, a Group III atom-containing material, and a Group IV atom-containing material, a binder, and an organic solvent. By using the phosphor paste composition, the deterioration of the phosphor can be prevented during a heat treating process. The flat display device includes a phosphor layer containing the phosphor coated with the heat-resistant material such that lifetime of the flat display device is increased and a permanent residual image phenomenon, the adsorption of water by the phosphor, and the like can be prevented.

12 Claims, 5 Drawing Sheets

U.S. PATENT DOCUMENTS

| | | | |
|---|---|---|---|
| 6,153,123 A * | 11/2000 | Hampden-Smith et al. | 252/301.4 S |
| 6,280,656 B1 | 8/2001 | O'Rourke et al. | |
| 7,429,340 B2 * | 9/2008 | Kwon | 252/301.36 |
| 2002/0180355 A1 * | 12/2002 | Mori et al. | 313/582 |
| 2003/0218877 A1 * | 11/2003 | Moon | 362/225 |
| 2004/0075388 A1 * | 4/2004 | Miyashita et al. | 313/586 |
| 2004/0196358 A1 * | 10/2004 | Murokh et al. | 347/255 |
| 2004/0239245 A1 | 12/2004 | Kawamura et al. | |

FOREIGN PATENT DOCUMENTS

| | | |
|---|---|---|
| CN | 1613962 A | 5/2005 |
| EP | 1350829 | 10/2003 |
| JP | 2000-87030 | 3/2000 |
| JP | 2000-87030 A | 3/2000 |
| KR | 10-2000-0008995 A | 2/2000 |
| KR | 2004-0003500 | 1/2004 |
| WO | WO 03/056596 | 7/2003 |

OTHER PUBLICATIONS

Zirconium Outlook, vol. 2 No. 4, Fall, 1981.*
Chinese Registration Determination Certificate of Patent for Invention Cert. No. 596106; Patent No. ZL200510105767.1, issued Feb. 3, 2010.

* cited by examiner

FLAT DISPLAY DEVICE, PLASMA DEVICE PANEL AND FIELD EMISSION CONTAINING PHOSPHOR COATED WITH A HEAT-RESISTANT MATERIAL

CROSS-REFERENCE TO RELATED APPLICATIONS

This application is a continuation of and claims the benefit under 35 U.S.C. §120 of U.S. application Ser. No. 11/244,735 filed Oct. 6, 2005 which is hereby incorporated in its entirety by reference. U.S. application Ser. No. 11/244,735 claims the benefit of Korean Patent Application No. 10-2004-0081093, filed on Oct. 11, 2004, in the Korean Intellectual Property Office, the disclosure of which is incorporated herein in its entirety by reference.

BACKGROUND OF THE INVENTION

1. Field of the Invention

The present invention relates to a phosphor paste composition, a flat display device including the same, and a method of manufacturing the flat display device, and more particularly, to a phosphor paste composition including a phosphor coated with at least a heat-resistant material selected from a Group II atom-containing material, a Group III atom-containing material, and a Group IV atom-containing material, a flat display device including the same, and a method of manufacturing the flat display device.

2. Description of the Related Art

Display devices mainly used in monitors of personal computers, TV receivers, or the like are important components of conventional information transfer media. Display devices are divided into cathode ray tubes (CRTs) using the emission of high-speed thermal electrons, and flat panel displays such as the recently developed liquid crystal displays (LCDs), plasma display panels (PDPs), field emission displays, and the like.

In a PDP, a voltage is applied between transparent electrodes, causing discharge at surfaces of a dielectric layer and a protecting layer on the electrodes, thereby generating UV light, among other wavelengths. Then, phosphors applied on a rear substrate are excited by the UV light, thus emitting visible light. In field emission displays, a strong electric field is applied to electron emission sources disposed at a predetermined interval on a cathode electrode, thus emitting electrons. The electrons collide with phosphors applied on a surface of an anode electrode. As a result, light is emitted.

A phosphor layer of a flat display device can be manufactured, for example, using the following method. First, a phosphor paste composition with a predetermined viscosity is manufactured. Then, a phosphor layer is formed by applying a region with the phosphor paste composition and then thermally treated, thus forming the phosphor layer. Such a method of manufacturing a phosphor layer is disclosed in, for example, Korean Patent No. 2004-0003500.

However, when the phosphor layer is formed from the phosphor paste composition, phosphorescent particles may deteriorate during a high-temperature heat treating process. In addition, even when a flat panel display including the phosphor layer operates, phosphorescent particles may be deteriorated by vacuum UV light, or the like. The deterioration of the phosphor results in a decrease in the reliability of the flat panel display.

SUMMARY OF THE INVENTION

The present invention provides a phosphor paste composition, a flat display device including the same, and a method of manufacturing the flat display device.

According to an aspect of the present invention, there is provided a phosphor paste composition including: a phosphor coated with at least a heat-resistant material selected from the group consisting of a Group II atom-containing material, a Group III atom-containing material, a Group IV atom-containing material; a binder; and an organic solvent.

According to another aspect of the present invention, there is provided a method of manufacturing a flat display device including: manufacturing the phosphor paste composition; coating the phosphor paste composition on a substrate; and heat-treating the phosphor paste composition.

According to still another aspect of the present invention, there is provided a flat display device including a phosphor layer which includes the phosphor paste containing a phosphor coated with the heat-resistant material. The flat display device may be manufactured using the above method.

The phosphor paste composition includes phosphors coated with heat-resistant material, and thus deterioration of the phosphors can be prevented during heat treatment. In addition, the heat-resistant material prevents deterioration of the phosphors due to vacuum UV light generated when the flat display device operates and water is adsorbed by the phosphorescent particle. As a result, the lifetime of the flat display device is increased, and permanent residual image phenomenon can be reduced.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
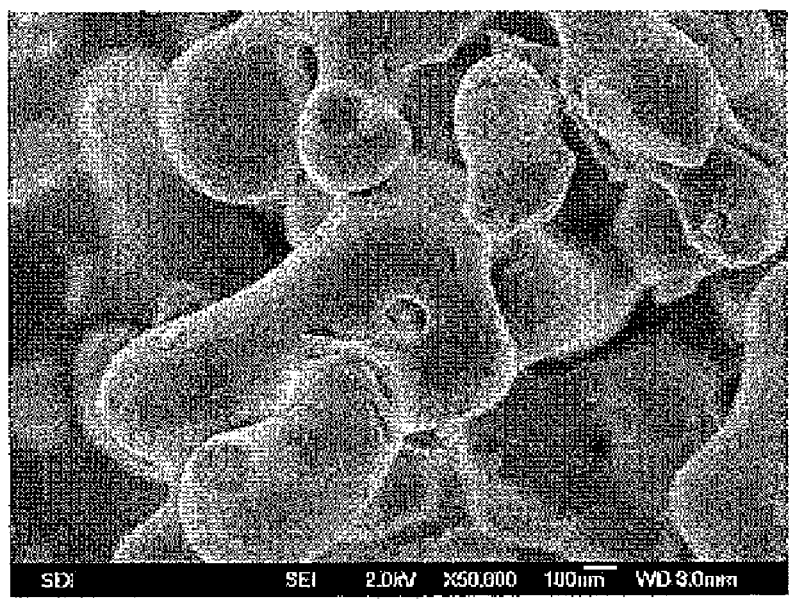
FIG. 1A is an SEM image of a phosphor completely coated with a $ZrO_2$ layer with a thickness of about 50 nm.

A phosphor paste composition according to an embodiment of the present invention includes a phosphor coated with at least a heat-resistant material selected from a Group II atom-containing material, a Group III atom-containing material, and a Group IV atom-containing material; a binder; and a solvent.

The heat-resistant material protects phosphorescent material from heat occurring, for example, when a phosphor layer of a flat display device is thermally treated, from vacuum UV light generated when the flat display device operates, and from water and oxygen which may combine with the phosphor when the flat display device operates.

Therefore, the heat-resistant material may be erosion-resistant and water-resistant, and have excellent surface hardness. In addition, the heat-resistant material may have excellent light-reflecting characteristics such that it does not absorb light emitted from the phosphor layer.

The heat-resistant material may have a melting point of from about 500° C. to about 2000° C., preferably about 1800° C. to about 2000° C. When the melting point of the heat-resistant material is less than 500° C., deterioration of the phosphor resulting due to a high-temperature heat treatment of the phosphor layer cannot be effectively prevented. When the melting point of the heat-resistant material is greater than 2000° C., the manufacturing costs increase.

The Group II atom may be Be, Mg, Ca, or the like. The Group III atom may be Sc, Y, La, or the like. The Group IV atom may be Ti, Zr, Hg, or the like. For example, the heat-resistant material may be an oxide, a nitride, or a carbonate of a Group II atom, Group III atom, or Group IV atom, an alloy of a Group II atom, Group III atom, or Group IV atom, or the like. Further examples of the heat-resistant material may be MgO, TiO, $TiO_2$, TiN, TiC, $ZrO_2$, ZrN, Zircalloy, ZICA-DYNE, $La_2O_3$, a combination of these, or the like, but is not limited thereto.

Although MgO and $La_2O_3$ have some water resistant properties, the combination of these materials with other materials may contribute to an improvement in water resistant properties. Meanwhile, $ZrO_2$, which is a white agent, has low thermal conductivity, high water resistance, and excellent light-reflecting characteristics. A zircalloy containing Zr and Sn has excellent erosion resisting characteristics at high temperatures. The zircalloy may further include Fe, Cr, Mo, V, Cu, Ni, and/or W to increase high-temperature erosion-resistance.

The phosphor may be a phosphor that is commonly used in a phosphor layer of a flat display device. In this case, the phosphor may include a conventional red (R) phosphor, a conventional green (G) phosphor, or a conventional blue (B) phosphor.

The phosphor may have an average diameter of 0.5 μm to 5.0 μm, preferably about 1.6 μm to about 2.8 μm. When the average diameter of the phosphor is less than about 0.5 μm, light characteristics deteriorate. When the average diameter of the phosphor is greater than about 5.0 μm, the surface of the phosphor layer is non-uniform due to a clogged nozzle.

According to an embodiment of the present invention, the phosphor may include a red phosphor including at least a phosphor selected from a $Y(V,P)O_4$:Eu phosphor, a $Y_2O_3$:Eu phosphor, and a $(Y,Gd)BO_3$:Eu phosphor, but is not limited thereto; a green phosphor including at least a phosphor selected from a $LaPO_4$:Ce,Tb phosphor, a $ZnGa_2O_4$:Mn phosphor, a $ReBO_3$:Tb phosphor wherein Re is a rare earth element or a combination of rare earth elements, a $Zn_2SiO_4$:Mn phosphor, and a $BaMgAl_{10}O_{17}$:Eu,Mn phosphor, but is not limited thereto; and a blue phosphor including at least a phosphor selected from a $BaMgAl_{10}O_{27}$:Eu phosphor, a $BaMgAl_{14}O_{23}$Pu phosphor, a $BaMg_2Al_{16}O_{27}$Eu phosphor, and a $CaMgSi_2O_6$:Eu phosphor, but is not limited thereto.

Figure 1B:
FIG. 1B is an SEM image of a phosphor partially coated with $ZrO_2$ with a diameter of about 70 nm.

The heat-resistant material may be coated on the phosphor using various methods. For example, the heat-resistant material may be coated on the entire surface of the phosphor or on a portion of the phosphor as a grain. FIG. 1A is an SEM image of a $BaMgAl_{10}O_{17}$:Eu blue phosphor completely coated with $ZrO_2$. Referring to FIG. 1A, $ZrO_2$ is uniformly coated on the surface of the $BaMgAl_{10}O_{17}$:Eu blue phosphor. This coating may be performed using a solid phase method, a spray thermal decomposition method, a liquid phase method, or the like. On the other hand, FIG. 1B is an SEM image of a B a$MgAl_{10}O_{17}$:Eu blue phosphor partially coated with $ZrO_2$. Referring to FIG. 1B, $ZrO_2$ is adhered as a grain on the surface of $BaMgAl_{10}O_{17}$:Eu blue phosphor. This coating may be performed using a solid phase method, a spray thermal decomposition method, a liquid phase method, or the like.

When the phosphor is completely coated, high-temperature deterioration of and adsorption of other impurities by the phosphor can be prevented. When the phosphor is partially coated, a decrease in luminance due to the entire coating can be minimized.

In the phosphor coated with at least the heat-resistant material, the amount of the heat-resistant material may be in the range of about 0.06 to about 0.7, preferably about 0.08 to about 0.24 parts by weight based on 100 parts by weight of the phosphor. When the amount of the heat-resistant material is less than about 0.06 parts by weight based on 100 parts by weight of the phosphor, the coating effect is negligible. That is, effective heat-resistance and water-resistance is not obtained. When the amount of the heat-resistant material is greater than about 0.7 parts by weight based on 100 parts by weight of the phosphor, luminance decreases and discharge in a plasma display panel decreases.

The phosphor paste composition includes a binder. The use of the binder results in an suitable viscosity of the phosphor paste composition. Typically, the binder is projected from a printing mask during a printing process and covers the phosphor such that the phosphor layer formed on a lower substrate of a PDP is uniform. The binder may include a cellulose resin and an acryl resin, for example. In detail, the binder may include at least a material selected from ethyl cellulose, nitro cellulose, and acryl resin, but is not limited thereto.

The amount of the binder may be about 5 to about 25 parts by weight, preferably about 7 to about 20 parts by weight, based on 100 parts by weight of the phosphor coated with a heat-resistant material. When the amount of the binder is less than 5 parts by weight based on 100 parts by weight of the phosphor, the desired viscosity is not obtained. When the amount of the binder is greater than about 25 parts by weight based on 100 parts by weight of the phosphor coated with a heat-resistant material, carbon atoms in the binder are not sufficiently removed when the phosphor paste composition is thermally treated, and the phosphor deteriorates.

The phosphor paste composition according to an embodiment of the present invention includes an organic solvent. Addition of the organic solvent causes the phosphor paste composition to have sufficient flow characteristics which causes the phosphor to be dispersed, and causes the binder to be dissolved. The organic solvent may include at least a component selected from terpineol, butyl carbitol, butyl carbitol acetate, pentanediol, dipentene, limonene, and distilled water, but is not limited thereto.

The amount of the organic solvent may be in the range of about 90 to about 250 parts by weight, preferably about 100 to about 230 parts by weight based on 100 parts by weight of the phosphor coated with a heat-resistant material. When the amount of the organic solvent is less than about 90 parts by weight based on 100 parts by weight of the phosphor, dispersion characteristics of the phosphor paste composition decreases. When the amount of the organic solvent is greater than about 250 parts by weight based on 100 parts by weight of the phosphor coated with a heat-resistant material, the viscosity of the phosphor paste composition is insufficient for forming the phosphor layer.

In addition to the phosphor coated with at least the heat-resistant material, the binder, and the organic solvent, the phosphor paste composition may further include an antifoaming agent, a dispersing agent, a plasticizing agent, or the like. The antifoaming agent or the dispersing agent may be silicon polyester resin, or the like. The plasticizing agent may be a pthalate compound, such as dioctyl pthalate, 2-ethylhexyl pthalate, diisononyl pthalate, dibutyl pthalate, diisodecyl pthalate, and/or the like.

A method of manufacturing a flat display device according to an embodiment of the present invention comprises providing a phosphor paste composition according to an embodiment of the present invention, coating the phosphor paste composition on a substrate, and heat-treating the phosphor paste composition.

First, the phosphor paste composition described above is prepared. The viscosity of the phosphor paste composition may be in the range of about 15000 cps to about 23000 cps, preferably about 17000 cps to about 21000 cps. When the viscosity of the phosphor paste composition is outside said range, printing properties of the phosphor paste composition may deteriorate and it is difficult to form a phosphor layer with a fine pattern.

Then, the phosphor paste composition is coated on the substrate. The substrate refers to a supporting substrate having a region on which the phosphor layer is to be formed. The substrate to be used depends on the type of flat display devices to be manufactured, and can be easily decided on by those skilled in the art according to types of flat display devices. For example, for a PDP, the substrate may be a region inside an emission cell of a rear panel, which includes a rear substrate, an address electrode, a rear dielectric layer covering the address electrode, a barrier rib partitioning the emission cell, and the like.

The phosphor paste composition may be coated on the substrate using various methods. For example, a dispenser device can be used.

The phosphor paste composition coated on the substrate is thermally heated to about 400° C. to about 600° C., preferably about 480° C. to about 550° C. Conventionally, the heat treatment is performed at about 480° C. However, in the present embodiment, the heat treatment can be performed at a temperature greater than about 480° C. because the phosphor contained in the phosphor paste composition is coated with the heat-resistant material. That is, even at such a high temperature, the deterioration of the phosphor can be prevented.

In the method of manufacturing the flat display device, the heat-treating process may be performed for about 1 to 2 hours, which is a third of the maximum of a conventional heat-treating period, which is 2 to 3 hours. Therefore, more flat display devices with large areas can be produced.

The flat display device according to an embodiment of the present invention includes a phosphor layer containing the phosphor coated with at least a heat-resistant material selected from a Group II atom-containing material, a Group III atom-containing material, and a Group IV atom-containing material. The heat-resistant material has excellent heat-resisting properties such that the deterioration of the phosphor due to vacuum UV light generated when the flat display device operates can be prevented. In addition, the heat-resistant material has excellent water resistant properties such that the adsorption of water by the phosphors can be prevented. Further, the heat-resistant material has excellent light reflectance such that emission of the phosphor layer is not disrupted. The heat-resistant material and the phosphor layer are the same as described above.

The flat display device including the phosphor layer, which includes the phosphor coated with the heat-resistant material, may be, for example, a PDP, a field emission display device, or the like. A PDP (plasma display device) according to an embodiment of the present invention is illustrated in FIG. 2.

Figure 2:
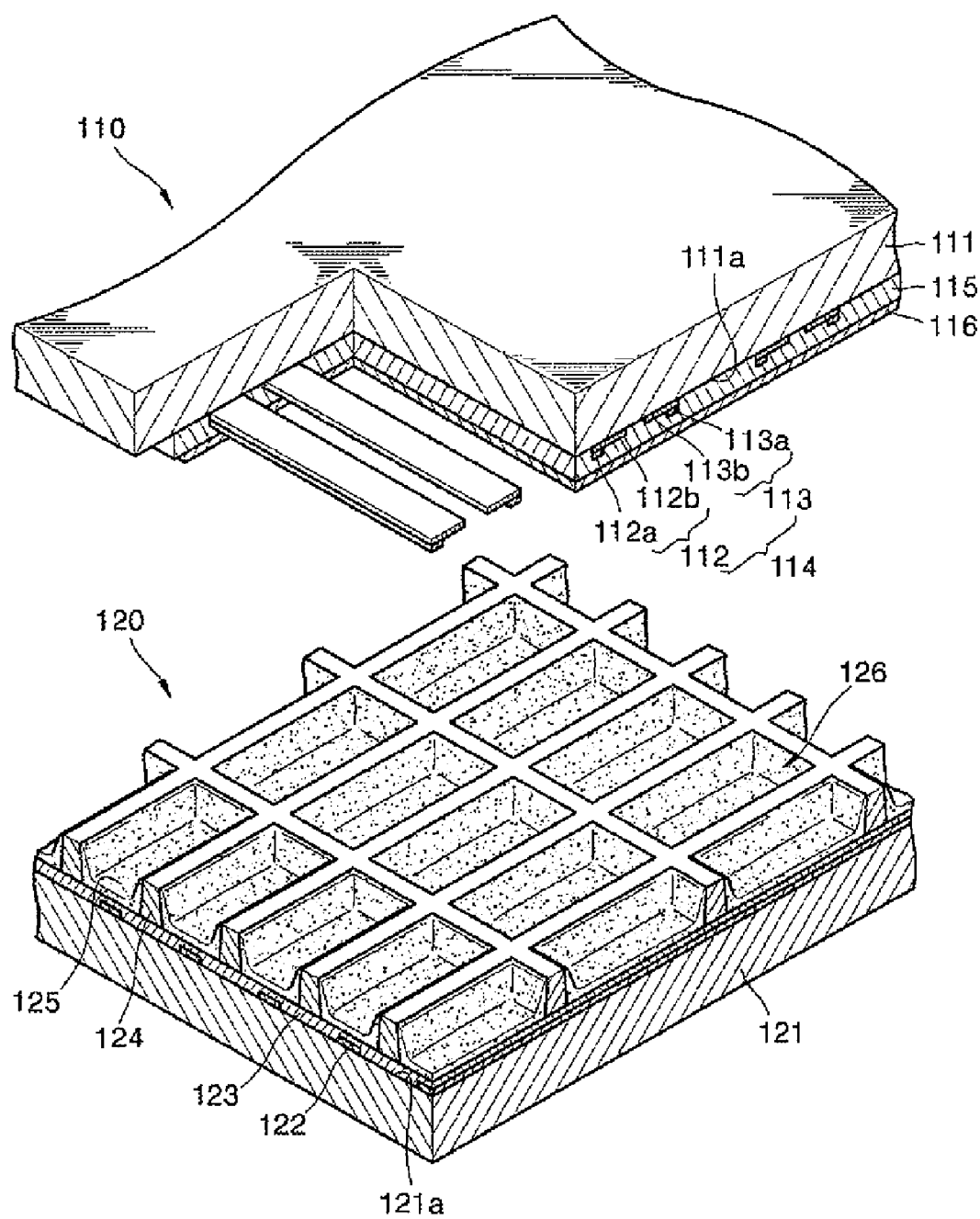
FIG. 2 is a an exploded perspective view of a plasma display panel according to an embodiment of the present invention.

Referring to FIG. 2, a front panel 110 includes a front substrate 111, a pair of sustain electrodes 114 including a Y electrode 112 and an X electrode 113 formed on a rear surface 111a of the front substrate 111, a front dielectric layer 115 covering the sustain electrodes, and a protecting layer 116 covering the front dielectric layer 115. The protecting layer 116 may be composed of a poly-crystal MgO sintering in which the concentration of impurities is less than or equal to 250 ppm. The Y electrode 112 includes a bus electrode 112a and a transparent electrode 112b. The X electrode 113 includes a bus electrode 113a and a transparent electrode 113b. The bus electrodes 112a and 113a may be composed of a metal with high conductivity, and the transparent electrodes 112b and 113b may be compose of ITO (indium tin oxide), or the like.

A rear panel 120 includes a rear substrate 121, address electrodes 122 formed on a front surface 121a of the rear substrate 121 and disposed perpendicular to the sustain electrodes 114, a rear dielectric layer 123 covering the address electrodes 122, and a barrier rib 124 partitioning emission cells 126 formed on the rear dielectric layer 123. A phosphor layer 125 including the phosphor paste composition, wherein the phosphor is coated with at least the heat-resistant material selected from a Group II atom-containing material, a Group III atom-containing material, and a Group IV atom-containing material is disposed inside the emission cell 126. The heat resisting material prevents the deterioration due to vacuum UV light generated when the flat display device operates and the adsorption of water by the phosphors. In particular, since the adsorption of water is prevented, the protecting layer 116 composed of a multi-crystal MgO sintering, which is formed on the emission cell 126, can be protected from damage due to water. The phosphor coated with the heat-resistant material is the same as described above.

Figure 3:
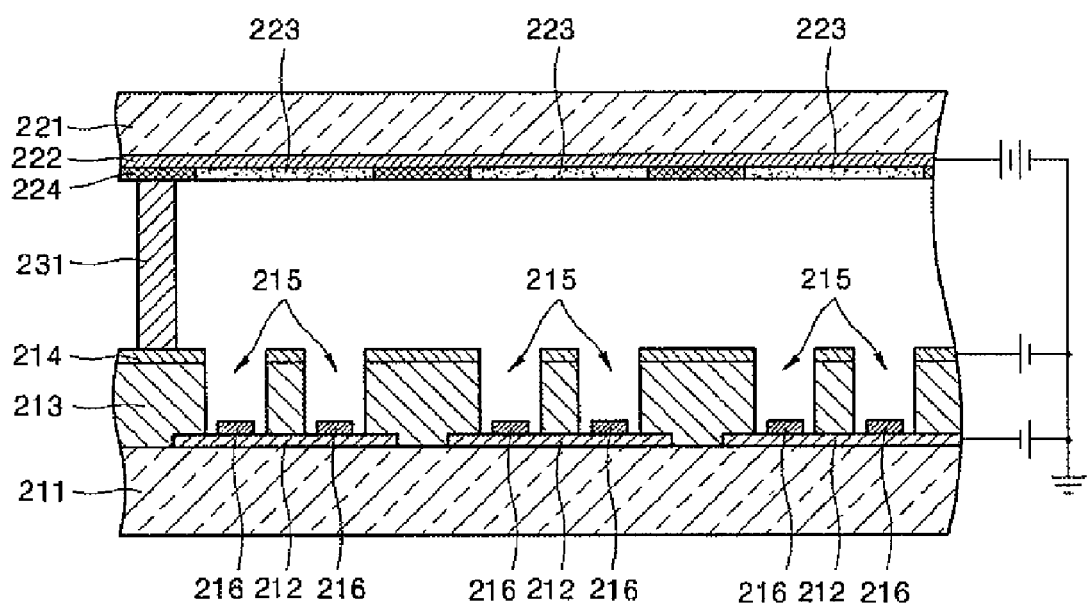
FIG. 3 is a sectional view of a field emission display device according to an embodiment of the present invention.

FIG. 3 is a sectional view of a field emission display device according to an embodiment of the present invention. Referring to FIG. 3, the field emission display device includes a cathode electrode 212, an anode electrode 222, and a gate electrode 214. The cathode electrode 212 and the gate electrode 214 are formed on a rear substrate 211 on which an electron emission source 216 is disposed. The anode electrode 222 is formed on the rear surface of a front substrate 221. A phosphor layer 223 including the phosphor paste composition, wherein the phosphors are coated with at least a heat-resistant material selected from a Group II atom-containing material, a Group III atom-containing material, and a Group IV atom-containing material, and a black matrix 224 for increasing contrast are formed on the rear surface of the anode electrode 222. An insulating layer 213 having fine openings 215 and a gate electrode 214 are sequentially deposited on the cathode electrode 212. The phosphor coated with the heat resisting material is the same as described above. The rear substrate 211 and the front substrate 221 are separated by a predetermined interval by a spacer 231 interposed between them.

As described above, the phosphor paste composition according to an embodiment of the present invention is used in a PDP and a field emission display device. However, the phosphor paste composition according to an embodiment of the present invention can be used in other display devices, such as back-light lamps or the like.

Hereinafter, the present invention will be described in detail by explaining examples with reference to the attached drawings. Like reference numerals in the drawings denote like elements.

EXAMPLES

Example 1

A Y(V,P)O$_4$:Eu red phosphor with an average diameter of about 2.5 μm was completely coated with 0.16 parts by weight of $ZrO_2$ based on 100 parts by weight of the $Y(V,P)O_4$:Eu red phosphor. 15 parts by weight of ethyl cellulose as a binder and 150 parts by weight of an organic solvent based on 100 parts by weight of the $Y(V,P)O_4$:Eu red phosphor completely coated with $ZrO_2$ were mixed using a paste mixer. As a result, 1 kg of a phosphor paste composition with a viscosity of 19000 cps to 21000 cps was manufactured. The organic solvent was prepared by mixing terpineol and butyl carbitol acetate with a volume ratio of 7:3. The phosphor paste composition manufactured according to the present example will be referred to as composition R1.

Example 2

A phosphor paste composition was manufactured in the same manner as in Example 1, except that a $Zn_2SiO_4$:Mn green phosphor completely coated with $ZrO_2$ was used instead of the $Y(V,P)O_4$:Eu red phosphor completely coated with $ZrO_2$. The phosphor paste composition manufactured according to the present example will be referred to as composition G1.

Example 3

A phosphor paste composition was manufactured in the same manner as in Example 1, except that a $BaMgAl_{10}O_{17}$:Eu blue phosphor completely coated with $ZrO_2$ was used instead of the $Y(V,P)O_4$:Eu red phosphor completely coated with $ZrO_2$. The phosphor paste composition manufactured according to the present example will be referred to as composition B1.

Example 4

A phosphor paste composition was manufactured in the same manner as in Example 1, except that the $Y(V,P)O_4$:Eu red phosphor was partially coated with $ZrO_2$. The phosphor paste composition manufactured according to the present example will be referred to as composition R2.

Example 5

A phosphor paste composition was manufactured in the same manner as in Example 1, except that a $Zn_2SiO_4$:Mn green phosphor partially coated with $ZrO_2$ was used instead of the $Y(V,P)O_4$:Eu red phosphor completely coated with $ZrO_2$. The phosphor paste composition manufactured according to the present example will be referred to as composition G2.

Example 6

A phosphor paste composition was manufactured in the same manner as in Example 1, except that a $BaMgAl_{10}O_{17}$:Eu blue phosphor partially coated with $ZrO_2$ was used instead of the $Y(V,P)O_4$:Eu red phosphor completely coated with $ZrO_2$. The phosphor paste composition manufactured according to the present example will be referred to as composition B2.

Comparative Example 1

A phosphor paste composition was manufactured in the same manner as in Example 1, except that the $Y(V,P)O_4$:Eu red phosphor was not coated with $ZrO_2$. The phosphor paste composition manufactured according to the present example will be referred to as composition R.

Comparative Example 2

A phosphor paste composition was manufactured in the same manner as in Example 1, except that a $Zn_2SiO_4$:Mn green phosphor that is not coated with $ZrO_2$ was used instead of the $Y(V,P)O_4$:Eu red phosphor completely coated with $ZrO_2$. The phosphor paste composition manufactured according to the present example will be referred to as composition G.

Comparative Example 3

A phosphor paste composition was manufactured in the same manner as in Example 1, except that a $BaMgAl_{10}O_{17}$:Eu blue phosphor that is not coated with $ZrO_2$ was used instead of the $Y(V,P)O_4$:Eu red phosphor completely coated with $ZrO_2$. The phosphor paste composition manufactured according to the present example will be referred to as composition B.

Measurement Example 1

Deteriorating Characteristics Due to Heat Treatment

Deterioration characteristics of the composition B1 manufactured according to Example 3 and the composition B manufactured according to Comparative Example 3 were measured using emission spectra of the compositions before and after a heat treatment. The emission spectra were measured in a Darsa system including a vacuum chamber with a pressure of $10^{-5}$ torr using a Kr-lamp spectrometer.

Figure 4A:
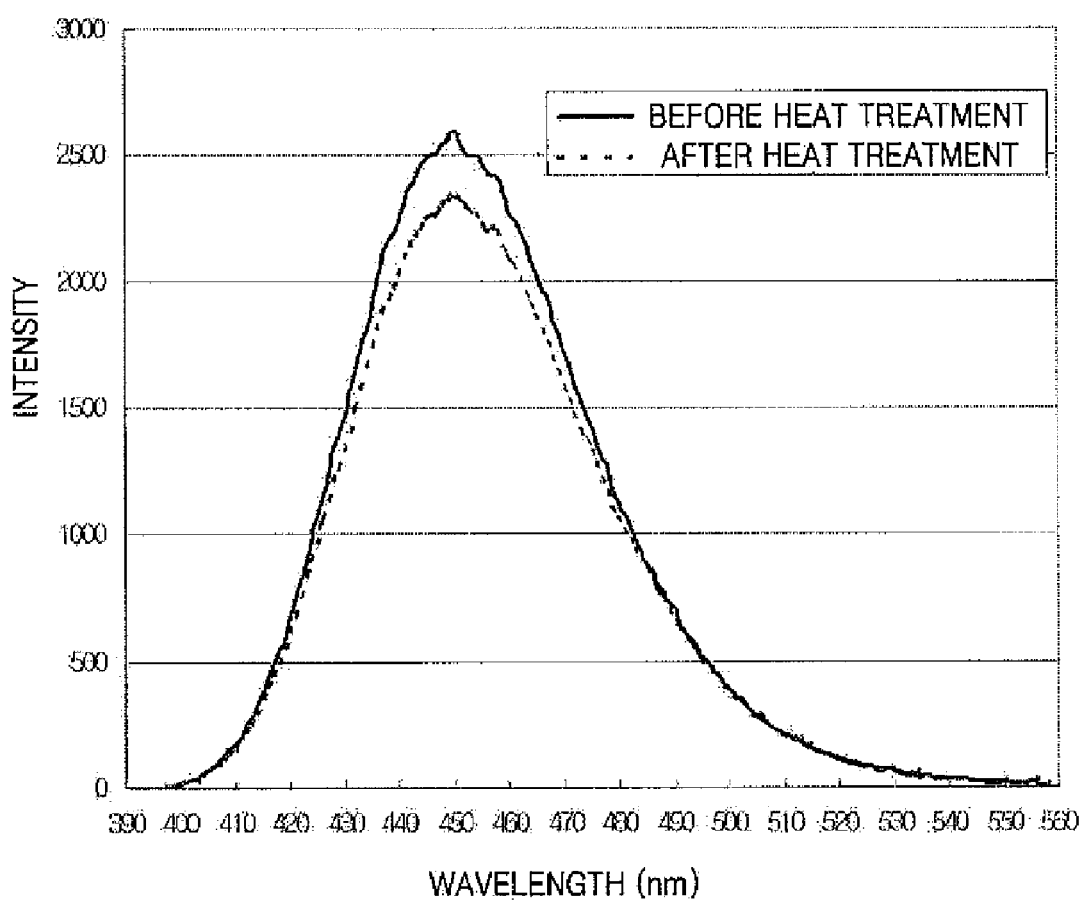
FIG. 4A are emission spectra of a conventional phosphor paste composition before and after a heat treatment.
Figure 4B:
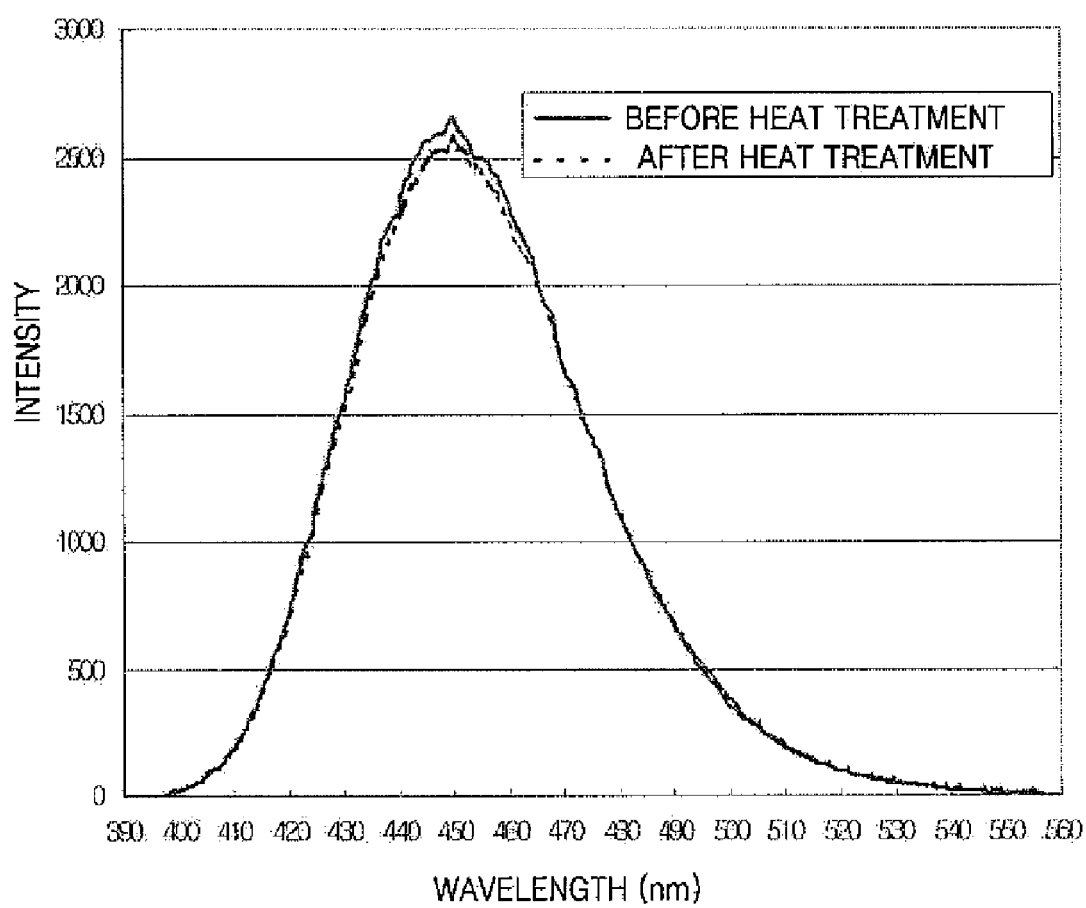
FIG. 4B are emission spectra of a phosphor paste composition according to an embodiment of the present invention before and after the heat treatment.

First, the respective emission spectra of the composition B1 and the composition B sprayed on a glass substrate were measured. Next, each of the composition B1 and the composition B was thermally heated at 500 DC for 60 minutes under atmospheric conditions or under an $N_2$ atmosphere. Then, the emission spectra were measured. Emission spectra of the composition B before and after the heat treatment are illustrated in FIG. 4A. Emission spectra of the composition B1 before and after the heat treatment are illustrated in FIG. 4B.

Referring to FIG. 4A, before the heat treatment, the composition B had a maximum emission intensity of about 2550 at about 455 nm. However, after the composition B was thermally treated, the maximum emission intensity was decreased to about 2300 at about 455 nm. Therefore, the heat treatment affects emission characteristics on the composition B. On the other hand, referring to FIG. 4B, after the composition B1 was thermally treated, the emission spectrum of the composition B1 was almost identical to the emission spectrum before the heat treatment. Therefore, the heat treatment did not affect emission characteristics on the composition B1.

Measurement Example 2

Time Period for Heat Treatment, and Longevity

A rear substrate including an address electrode, a rear dielectric layer covering the address electrode, and a barrier rib defining emission cells were prepared. The composition R1 manufactured according to Example 1, the composition G1 manufactured according to Example 2, and the composition B1 manufactured according to Example 3 were sprayed in the emission cells using a dispenser device to form a red phosphor layer (R), a green phosphor layer (G), and a blue phosphor layer (B), respectively. At this time, the spraying pressure was adjusted such that each of the phosphor paste compositions R1, G1, and B1 was formed to a thickness of about 100 µm on the layer. The compositions R1, G1, and B1 coated on the emission cell sat at 100° C. for 15 minutes. The temperature was repeatedly increased by 50° C., and the compositions R1, G1, and B1 sat for 15 minutes after each increase in temperature. When the temperature reached 500° C., the compositions R1, G1, and B1 were thermally treated for 40 minutes under atmospheric conditions or under an N atmosphere. Then, the amounts of time required to complete the heat treatments were measured. The resulting panel will be referred as panel 1.

The described process was repeated, except that the compositions R2, G2, and B2 manufactured according to Examples 4 to 6, respectively, were used instead of the compositions R1, G1, and B1. The resulting panel will be referred as panel 2. The described process was repeated again except that the compositions R, G, and B manufactured according to Comparative Examples 1 to 3, respectively, were used instead of the compositions R1, G1, and B1 and the temperature was increased to 470° C. instead of 500° C. The resulting panel will be referred to as panel A. Amounts of time taken when the panels 1, 2 and A are thermally treated were shown in Table 1.

In addition, the luminosities of the panels 1, 2, and A were measured using a Kr-lamp spectrometer in a Darsa system Darsa Mono 3 Spectrometer (Professional Scientific Instrument Co., Seoul, Korea) including a vacuum chamber with a pressured of $10^{-5}$ torr. The luminosities were measured 24 hours, 100 hours, 500 hours, and 1000 hours after the luminosities were initially measured. These luminosities are expressed as percentages of the initial luminance in Table 1.

TABLE 1

| | | | Panel A | Panel 1 | Panel 2 |
|---|---|---|---|---|---|
| | | | \multicolumn{3}{c}{Amount of time (min)} |
| | | | 110 | 40 | 40 |
| | | | \multicolumn{3}{c}{Initial luminance (cd/m$^2$) (white)} |
| | | | 198 | 189 | 193 |
| Luminosities (% of initial luminosity) | 0 hour | R | 100 | 100 | 100 |
| | | G | 100 | 100 | 100 |
| | | B | 100 | 100 | 100 |
| | 24 hours | R | 101 | 101 | 101 |
| | | G | 96 | 99 | 99 |
| | | B | 94 | 99 | 98 |
| | 100 hours | R | 102 | 102 | 102 |
| | | G | 94 | 98 | 98 |
| | | B | 90 | 97 | 96 |
| | 500 hours | R | 101 | 101 | 101 |
| | | G | 90 | 96 | 95 |
| | | B | 82 | 93 | 92 |
| | 1000 hours | R | 100 | 100 | 100 |
| | | G | 87 | 94 | 93 |
| | | B | 76 | 91 | 90 |

Referring to Table 1, the amount of time that the panel A was heat treated was 100 minutes, 70 minutes longer than the amounts of time that the panels 1 and 2 were heat treated. The increase by 70 minutes may result from the use of the temperature of 470° C., which was chosen to prevent the deterioration of the phosphor during the heat-treating process. Therefore, it was confirmed that the use of the panels 1 and 2 coated with according to an embodiment of the present invention contributes to a decreased manufacturing time.

In addition, the luminosities of the panel A, in particular, a green phosphor and a blue phosphor, were 87% and 76% of the initial luminances after 1000 hours, respectively. However, the luminosities of the panel 1, in particular, a green phosphor and a blue phosphor, were 94% and 91% of the initial luminances after 1000 hours, respectively. In addition, the luminosities of the panel 2, in particular, a green phosphor and a blue phosphor, were 93% and 90% of the initial luminances after 1000 hours, respectively. That is, the deterioration of each of the panels 1 and 2 was less than that of the panel A, thus ensuring a longer lifetime.

A phosphor paste composition according to the present invention includes a phosphor coated with at least a heat-resistant material selected from a Group II atom-containing material, a Group III atom-containing material, and a Group IV atom-containing material such that deterioration can be prevented during a heat treating process. A flat display device according to the present invention includes the phosphor coated with the heat-resistant material such that the phosphor deterioration due to ion impacting occurring when the flat display device operates can be decreased, thus increasing the lifetime of the flat display device. In addition, the use of the phosphor in the flat display device decreases a permanent residual image phenomenon and prevents the adsorption of water to the phosphor, thus increasing the reliability of the flat panel device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A flat display device comprising a phosphor layer comprising phosphors coated with at least a heat-resistant material selected from the group consisting of a Group II atom-containing material, a Group III atom-containing material, and a Group IV atom containing material, wherein the heat-resistant material comprises at least one selected from the group consisting of TiO, TiN, TiC, and ZrN;

wherein the phosphor is selected from the group consisting of a red phosphor including at least a phosphor selected from the group consisting of a Y(V,P)O$_4$:Eu phosphor, a Y$_2$O$_3$:Eu phosphor, and a (Y,Gd)BO$_3$:Eu phosphor; a green phosphor including at least a phosphor selected from the group consisting of a LaPO$_4$:Ce,Tb phosphor, a ZnGa$_2$O$_4$:Mn phosphor, a ReBO$_3$:Tb phosphor where Re is a rare earth element or a combination of rare earth elements, a Zn$_2$SiO$_4$:Mn phosphor, and a BaMgAl$_{10}$O$_{17}$:Eu,Mn phosphor; and a blue phosphor including at least a phosphor selected from the group consisting of a BaMgAl$_{10}$O$_{17}$:Eu phosphor, a BaMgAl$_{14}$O$_{23}$:Eu phosphor, a BaMg$_2$Al$_{16}$O$_{27}$:Eu phosphor, and a CaMgSi$_2$O$_6$:Eu phosphor.

2. The flat display device of claim 1, wherein the melting point of the heat-resistant material is from about 500° C. to about 2000° C.

3. The flat display device of claim 1, wherein the heat-resistant material includes at least ZrN.

4. The flat display device of claim 1, wherein the phosphor has an average diameter of from about 0.5 µm to about 5.0 µm.

5. The flat display device of claim 1, wherein the phosphor is completely or partially coated with the heat-resistant material.

6. The flat display device of claim 1, wherein the phosphor is coated with from about 0.06 to about 0.7 parts by weight of the heat-resistant material based on 100 parts by weight of the phosphor.

7. The flat display device of claim 1, wherein the flat display device is a plasma display panel or a field emission display device.

8. A plasma display panel comprising a phosphor layer comprising
  phosphors coated with at least a heat-resistant material selected from the group consisting of a Group II atom-containing material, a Group III atom-containing material, and a Group IV atom-containing material, wherein the heat-resistant material comprises at least one selected from the group TiO, TiN, TiC, and ZrN;
  wherein the phosphor is selected from the group consisting of a red phosphor including at least a phosphor selected from the group consisting of a $Y(V,P)O_4$:Eu phosphor, a $Y_2O_3$:Eu phosphor, and a $(Y,Gd)BO_3$:Eu phosphor; a green phosphor including at least a phosphor selected from the group consisting of a $LaPO_4$:Ce,Tb phosphor, a $ZnGa_2O_4$:Mn phosphor, a $ReBO_3$:Tb phosphor where Re is a rare earth element or a combination of rare earth elements, a $Zn_2SiO_4$:Mn phosphor, and a $BaMgAl_{10}O_{17}$:Eu,Mn phosphor; and a blue phosphor including at least a phosphor selected from the group consisting of a $BaMgAl_{10}O_{17}$:Eu phosphor, a $BaMgAl_{14}O_{23}$:Eu phosphor, a $BaMg_2Al_{16}O_{27}$:Eu phosphor, and a $CaMgSi_2O_6$:Eu phosphor.

9. A plasma display panel of claim 8, comprising a first panel and a second panel;
  wherein the first panel comprises:
  a first substrate;
  a pair of sustain electrodes including a Y electrode and an X electrode formed on a rear surface of the first substrate;
  a first dielectric layer covering the sustain electrodes; and a protecting layer covering the first dielectric layer;
  and the second panel comprises:
  a second substrate;
  address electrodes formed on the second substrate and disposed perpendicular to the sustain electrodes;
  a second dielectric layer covering the address electrodes;
  a barrier rib partitioning emission cells formed on the second dielectric layer;
  and the phosphor layer.

10. The plasma display panel of claim 9, wherein the protecting layer is composed of a poly-crystalline MgO.

11. The plasma display panel of claim 9, wherein each of the Y electrode
  and
  the X electrode comprises a bus electrode and a transparent electrode.

12. A field emission display device comprising:
  a first substrate on which a cathode electrode, a gate electrode and an electron emission source are formed;
  a second substrate on which an anode electrode and a phosphor layer are formed; wherein the phosphor layer comprises phosphors coated with at least one heat-resistant material selected from the group consisting of a Group II atom-containing material, a Group III atom-containing material, and a Group IV atom-containing material and is formed on the anode electrode, wherein the heat-resistant material comprises at least one selected from the group TiO, TiN, TiC, and ZrN;
  wherein the phosphor is selected from the group consisting of a red phosphor including at least a phosphor selected from the group consisting of a $Y(V,P)O_4$:Eu phosphor, a $Y_2O_3$:Eu phosphor, and a $(Y,Gd)BO_3$:Eu phosphor; a green phosphor including at least a phosphor selected from the group consisting of a $LaPO_4$:Ce,Tb phosphor, a $ZnGa_2O_4$:Mn phosphor, a $ReBO_3$:Tb phosphor where Re is a rare earth element or a combination of rare earth elements, a $Zn_2SiO_4$:Mn phosphor, and a $BaMgAl_{10}O_{17}$:Eu,Mn phosphor; and a blue phosphor including at least a phosphor selected from the group consisting of a $BaMgAl_{10}O_{17}$:Eu phosphor, a $BaMgAl_{14}O_{23}$:Eu phosphor, a $BaMg_2Al_{16}O_{27}$:Eu phosphor, and a $CaMgSi_2O_6$:Eu phosphor.

* * * * *